May 20, 1969 W. E. SCHNITTKER 3,444,895
THREE-WAY SOLENOID VALVE
Filed July 1, 1966
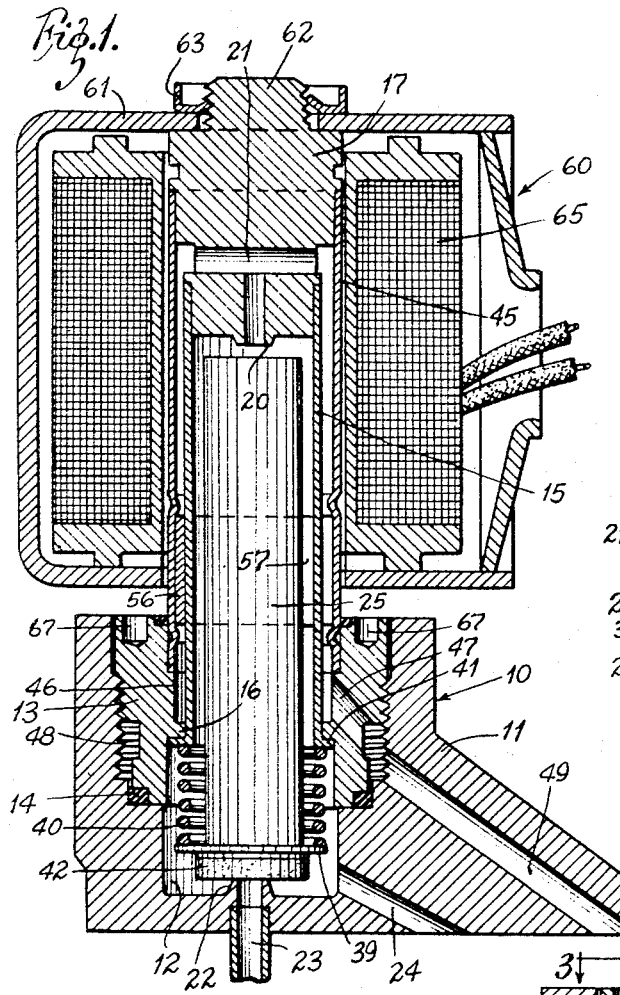
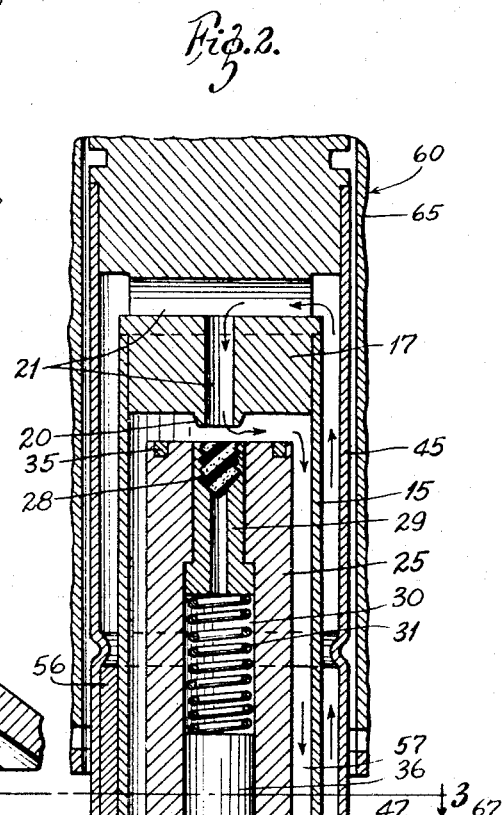
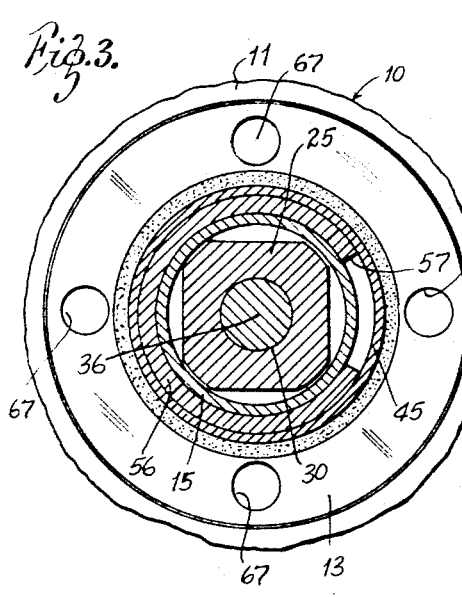
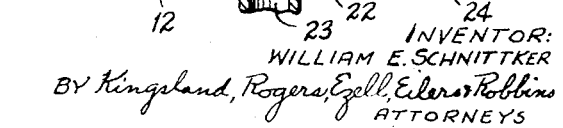
INVENTOR:
WILLIAM E. SCHNITTKER
BY Kingsland, Rogers, Ezell, Eilers & Robbins
ATTORNEYS

United States Patent Office 3,444,895
Patented May 20, 1969

3,444,895
THREE-WAY SOLENOID VALVE
William E. Schnittker, Crestwood, Mo., assignor to Alco Valve Company, Creve Coeur, Mo., a corporation of Missouri
Filed July 1, 1966, Ser. No. 562,369
Int. Cl. F16k *11/06, 31/08*
U.S. Cl. 137—625.65           4 Claims

ABSTRACT OF THE DISCLOSURE

A three-way solenoid valve in which all three ports are supplied in a base portion with the solenoid coil secured removably to a tubular projection from the base portion whereby the magnetic coil may be removed for servicing without interfering with the fluid connections. Also the tubular projection consists of an inner and an outer tubular sleeve, the inner one containing a magnetic core to operate valves at each of its opposite ends, the inner and outer tubular portions being fixedly mounted in a plug and removably insertable into a base portion so that the plug with the tubular parts may be removed from the base to give access to the plunger for servicing of the valves. This latter also can be done without upsetting the fluid connections and by use of a thin spanner wrench can be done without removing the solenoid coil if desired.

---

The present invention relates to a small direct acting three-way solenoid valve design and to certain features thereof that are capable of use in solenoid valves and similar environments. Specifically, the invention relates to a three-way valve having a magnetic plunger in a housing, providing a poppet valve at each end, to be operated, respectively, upon energization and deenergization of the magnetic coil, designed to enable all of the three fluid connections to enter into one end of the valve housing, and the magnetic coil to be applied from the opposite end. Thus either the magnetic coil or the fluid connections may be separately removed without disturbing the other.

The construction employs a housing base, preferably comprising an outer part and an inner plug, with an inner and an outer tube projecting concentrically from the plug. The inner tube and the base thus form a plunger chamber for the reciprocating core or plunger. There is a valve seat at each end of the plunger chamber, operated by reciprocation of the plunger. The outer tube surrounds the projecting inner tube, and is in turn surrounded by the magnetic coil. The outer tube comprises a fluid space into which the upper valve opens. Since the outer tube brings its fluid space from above the upper valve, then inside the magnetic coil to the housing base, all three fluid connections, two to the inner fluid chamber and one to the outer fluid space, can all be connected into the device at its lower end, to be free of the magnetic installation at the other end. A gapped magnetic ring fills the space between the outer tube and the inner tube adjacent the end of the coil. This avoids excessive air gap. The ring is axially broken to provide a fluid passage from one end to the other of the outer tube, since the fluid must be conducted from the upper valve to below the coil, to enable the fluid connection to be separate from the magnetic coil attaching means. There are three passages. in the base. One connects into the plunger chamber between the valve seats. One connects to the fluid space between the tubes. The third connects with the first-described valve seat. One passage may connect to a source of fluid under pressure; and one to a fluid pressure relief. The one between the valve seats may lead to work, such as a cylinder to be operated in one direction by fluid pressure.

In the prior art, there have been three-way magnetic solenoid valves with poppets above and below, but they have had the third outlet at the top. This has the disadvantage of requiring disconnection of fluid lines through such top outlet whenever it is necessary to service or replace the magnetic coil. Also it is usually advantageous to have all of the fluid connections at one side of the valve. But the problems of putting all the fluid connections at one end have been both structural and magnetic. All of these problems have here been overcome.

Referring to the drawings,

FIGURE 1 is a vertical diametrical section through the valve, the plunger being released;

FIGURE 2 is a similar view somewhat enlarged and showing the plunger portions in section; and FIGURE 3 is a section taken on the line 3—3 of FIGURE 2.

The valve body is illustrated as a composite structure generally designated at 10. It has an outer base or body portion 11 having a chamber portion 12 therein, and an inner plug 13, threadedly secured into the body portion 11 and sealed therein by an appropriate sealing ring 14. The housing also includes an inner tube 15, sealingly secured into and projecting upwardly from an inwardly projecting shoulder 16 within the plug 13. The tube 15 must be sealed at this junction. The top of the tube 15 is closed by a top plug 17. The chamber 12, enclosed by the housing base and the tube 15, is a valve chamber. A port or passage 24 enters this valve chamber between the valve seats 20 and 22.

There is a first valve seat 20 controlling a port or passage 21 through the top plug 17. There is a second valve seat 22 controlling a second port or passage 23 through the housing base 11. Both valve seats and ports control flow into and out of the valve chamber 12. A magnetic core or plunger 25 reciprocates within the chamber 12 and has valve means at its opposite ends. The plunger 25 is square shaped with rounded corners so as to reciprocate freely in the tube 15 but to be guided therein, and to permit fluid flow in the chamber 12 from end to end.

The plunger 25 has a first valve plug 28, of rubber or like material, supported in a tubular, flanged fitting 29 reciprocably mounted as shown, in a passage 30 of different diameters, that extends through the plunger. A spring 31 urges the fitting 29 and the valve 28 to their upper limit, but yields to enable the plunger 25 to continue upwardly after the valve engages the seat 20, until the air gap between the core and cap or plug 17 is minimized. A shading ring 35 is at the upper end of the plunger.

A plug 36 backs up the spring 31 and is pinned at 37 into the plunger. The plug is flanged at its bottom to support a washer 39 that engages a coil spring 40. The other end of the coil spring engages a flange 41 on the tube 15, that is brazed to the plug 13. A valve 42 of rubber or the like is molded into the plug 36, and can seal onto the valve seat 22. The spring 40 normally urges the plunger downwardly, and renders the valve independent of gravity for mounting in any position. Reference herein to positions is for convenience.

The inner tube 15 projects from the base 11 to enter the middle of a magnetic core. But means are provided to enable the core to be removed without disturbing the fluid connections, even though the plunger is designed to operate a poppet valve at each end.

An outer tube 45 is mounted on the plug 13 to surround the tube 15 and be spaced therefrom. The tube 45 opens into a chamber 46 in the plug 13, above the ridge 16. A passage 47 extends from the chamber 46 through the wall of the plug 13 to a cutaway space 48 around the plug that renders fluid flow independent of angular orientation of the plug 13 in the base 11. The base 11 has a continuation 49 of the passage 47, to which piping may be connected.

The outer tube 45 has a top closure onto the plug 17. The passage 21 communicates through the valve seat 20 to the space between the inner and outer tubes 15 and 45 that is part of the fluid space 46 connecting to the port or passage 47. This space is designed to bring the fluid passage 21 down below the magnetic coil.

There is a gapped band or ring 56 held in the space between the tubes 15 and 45 adjacent the lower end of the coil. It is of magnetic material and is provided to minimize the air gap from the coil to the core 25. It snugly fills the space, and is held between crimped indentations in the outer tube 45. Its gap 57 permits flow from end to end of the tube 45.

There is a magnetic coil assembly 60 mounted around the outer tube 45. It may comprise a U-shaped bracket 61 that has a lower opening to permit it to be fitted over the outside of outer tube 45 and an upper, smaller opening permitting it to fit over a threaded extension 62 on the top plug 17 and to rest on the upper shoulder thereof. A lock nut 63 secures the bracket firmly in position.

The bracket holds a coil support and coil shown diagrammatically and generally designated as 65. This coil provides the usual cylindrical, magnetic coil. The upper plug 17 is of magnetic material. The tubes 15 and 45 are of nonmagnetic material. The bracket 61 is of magnetic material. The ring 56 is magnetic.

*Assembly*

The outer and inner tubes 45 and 15 are permanently secured to the plug 13, and to the cap 17. The split or gapped ring 56 can be fitted into place during assembly of the foregoing by compressing its diameter so that it passes within the crimping illustrated and is held in fixed axial position thereby.

The plunger 25, fitted with its valve plug 28, valve seat fitting 29, spring 31, and other associated elements, and with the spring 40 disposed about the plunger 25, is then located in the inner tube 15. The spring 40 urges the plunger downwardly.

The foregoing subassembly on the threaded plug 13 is then fitted into the lower valve housing member 11 by threading the plug 13 into place and sealing it with the ring 14. The threads are also sealed with an adhesive. Appropriate spanner wrench holes 67 are provided in the upper surface of the plug for the foregoing purpose.

The magnetic coil assembly 60 is placed over the upper end of the outer tube 45 and secured in place by the lock nut 63 which engages over the threaded projection 26 on the housing plug 17.

If it is necessary to service or replace portions of the magnetic coil assembly, such can be done readily by simply removing it. This can be accomplished by releasing the lock nut 63 and taking the assembly off, repairing or replacing it, and returning it. This can be done without any effect upon the fluid connections.

If it is necessary to replace the valve elements, this can be done by removing the plug 13 from the base 11. Usually, because of the limitation of space for the spanner wrench, it is desirable to remove the magnetic coil assembly 60 first. In any case, when the plug 13 is removed, the valve parts are accessible. The parts principally subject to wear are the valve elements 28 and 42. The plug 28 is threaded or molded into the fitting 29 and is accessible for replacement when the plunger 25 is removed from its subassembly after the plug 13 is unscrewed. The pin 37 can be driven out of place and the inner plug 36 removed, giving complete access for replacement of any of the upper valve plug parts.

*Operation*

In the typical installation suggested, a fluid pressure source is connected to the inlet 49. The cylinder or other device to be operated is connected to the passage 24 and a sump or other pressure relief is connected to the passage 23.

At the start it will be assumed that the magnetic coil 65 is deenergized. Accordingly, the plunger 25 is down, the valve 28 is open, and the valve 42 is closed. The fluid pressure enters the passage 49, the free space 46 and the passage 21. Fluid flows upwardly between the two cylinders 45 and 15 through the gap 57 in the magnetic ring 43, to the passage 21 in the top plug 17. The valve 28 being open, fluid flows through the valve chamber 12, around the outside of the plunger 25. The valve seat 22 being closed, this fluid under pressure flows through the work passage 24 to the work, here suggested to be a fluid pressure cylinder where it moves a piston in one direction.

When the magnetic coil is energized, magnetic flux passes through the bracket 61, the upper plug 17 and the gapped ring 56, acting upon the plunger 25 to urge it upwardly, against the spring 40. This brings the valve 28 against the valve seat 20, closing off the passage 21. The plunger 25 continues upwardly until the air gap between the plunger and the surface of the plug 17 is minimized. In this latter action, the valve 28 yields, compressing the spring 31 and permitting a tight closure of the valve and at the same time a minimizing of the air gap and consequently obtaining the maximum efficiency of the magnetic action.

Closing of the valve seat 20 cuts off the pressure source from the valve chamber 12 and opens the sump passage 23. This permits the work passage 24 to exhaust to the sump, and the cylinder can be relieved so that its piston can move in the opposite direction.

What is claimed is:

1. In a solenoid valve device: a housing having a tubular core chamber and a magnetic plunger reciprocable within the chamber, and providing for fluid flow axially from one end to the other of the plunger; a first fluid port and a first valve seat at one end of the chamber, and a second port and second valve seat at the opposite end thereof, first and second valve means for the two valve seats, respectively, the valve means being operated to close their respective ports by opposite reciprocations of the plunger, each such reciprocation closing the one end opening the other port, the housing having a work port connecting into the core chamber between the two valve seats, to be connected with the first port when the plunger operates to open the first valve seat, and to be connected with the second fluid port when the plunger operates to open the second valve seat, the housing having a base portion and a separable plug, the plug acting as a closure for the chamber, with an inner tubular wall part opening into an end of the tubular core chamber and projecting out of the plug, the second valve seat and port being at the outer end of the tubular wall part; an outer tubular casing surrounding the inner tubular wall part and spaced laterally from the walls thereof to enclose the same, the outer casing and inner tubular wall part being secured at their ends to the plug and being mounted thereon, fluid flow space between the outer casing and the inner tubular wall part; the second port opening into said space; a magnetic coil surrounding the outer tubular casing at one end thereof to embrace the same including the first port and first valve seat, the plunger extending into the magnetic field of the coil to be reciprocated thereby; means removably securing the coil about the said casing, the tubular core chamber and the fluid passage all extending beyond the end of the magnetic coil, and the first, second, and third ports all connecting into the valve device from the same side of the magnetic coil, the coil being removable from the opposite side without disturbing fluid connections to said three ports.

2. The valve device of claim 1, wherein there is a broken ring of magnetic material within the fluid space between the outer casing and the inner tubular wall part adjacent one end of the coil, to aid the magnetic flux path from the coil to the core, the ring having an axial gap to permit flow of fluid axially in the space.

3. The valve device of claim 1, wherein each valve means comprises a poppet valve cooperable with its respective seat, the first valve being within the magnetic coil and closed when the coil is energized, and comprising a valve element reciprocably supported on the plunger and urged to a predetermined position toward the valve seat, but yieldable away from that position in the plunger to enable the plunger to approach the plug at the end of the first tube.

4. The valve of claim 1, with a spring surrounding the plunger and urging it to close one of the valves, the plug being sealed into but removable from the base portion with the tube and outer casing attached to it to give access to the plunger for servicing of the valves.

References Cited

UNITED STATES PATENTS

| | | | |
|---|---|---|---|
| 2,569,751 | 10/1951 | Dube et al. | 137—625.27 |
| 2,898,936 | 8/1959 | Collins | 137—625.27 XR |
| 2,965,135 | 12/1960 | Frantz | 137—625.27 |
| 3,022,799 | 2/1962 | Padula | 137—625.27 XR |
| 3,172,637 | 3/1965 | Adams et al. | 137—625.27 XR |
| 3,185,177 | 5/1965 | Brandenberg et al. | 137—625.27 |
| 3,351,093 | 11/1967 | Frantz | 137—625.27 |

FOREIGN PATENTS 868,896  5/1961  Great Britain.

M. CARY NELSON, *Primary Examiner.*

ROBERT J. MILLER, *Assistant Examiner.*